United States Patent [19]

Crow

[11] 4,165,882
[45] Aug. 28, 1979

[54] SEALING MEANS FOR SLIDE GATE

[75] Inventor: Harold E. Crow, Middletown, Ohio

[73] Assignee: Armco Steel Corporation, Middletown, Ohio

[21] Appl. No.: 870,723

[22] Filed: Jan. 19, 1978

[51] Int. Cl.² .......................... E02B 7/54; F16J 15/32
[52] U.S. Cl. ....................................... 277/168; 277/12; 405/104
[58] Field of Search ................... 61/22 R, 22 A, 28; 405/103–135; 277/12, 165, 166, 168–172, 186, DIG. 4

[56] References Cited

U.S. PATENT DOCUMENTS

| | | | |
|---|---|---|---|
| 1,868,147 | 7/1932 | Kruse | 405/104 |
| 2,462,596 | 2/1949 | Bent | 277/168 X |
| 2,553,222 | 5/1951 | Wallgren et al. | 277/168 X |
| 2,683,354 | 7/1954 | Harza | 405/104 |
| 3,575,431 | 4/1971 | Bryant | 277/171 |

FOREIGN PATENT DOCUMENTS

| | | | |
|---|---|---|---|
| 2619666 | 11/1976 | Fed. Rep. of Germany | 61/22 A |
| 620224 | 3/1949 | United Kingdom | 61/22 A |
| 1161202 | 8/1969 | United Kingdom | 277/171 |

*Primary Examiner*—Robert S. Ward, Jr.
*Attorney, Agent, or Firm*—Melville, Strasser, Foster & Hoffman

[57] ABSTRACT

An improved sealing means for use with a slide gate which is slidably mounted for opening and closing movement relative to a seat forming frame defining a fluid flow orifice. The sealing means comprises a resilient sealing member adapted to be received in a groove in the frame, the groove having an outer compartment in which the body of the sealing member is sealed and an inner compartment underlying the outer compartment, the sealing member having an outwardly projecting contoured face adapted to be contacted and displaced laterally inwardly by the gate as it is closed, the lateral displacement of the face of the sealing member causing a rear portion of its body to be displaced into the inner compartment of the groove, thereby accommodating the sealing member to the slide and relieving forces acting to shear the sealing member.

8 Claims, 9 Drawing Figures

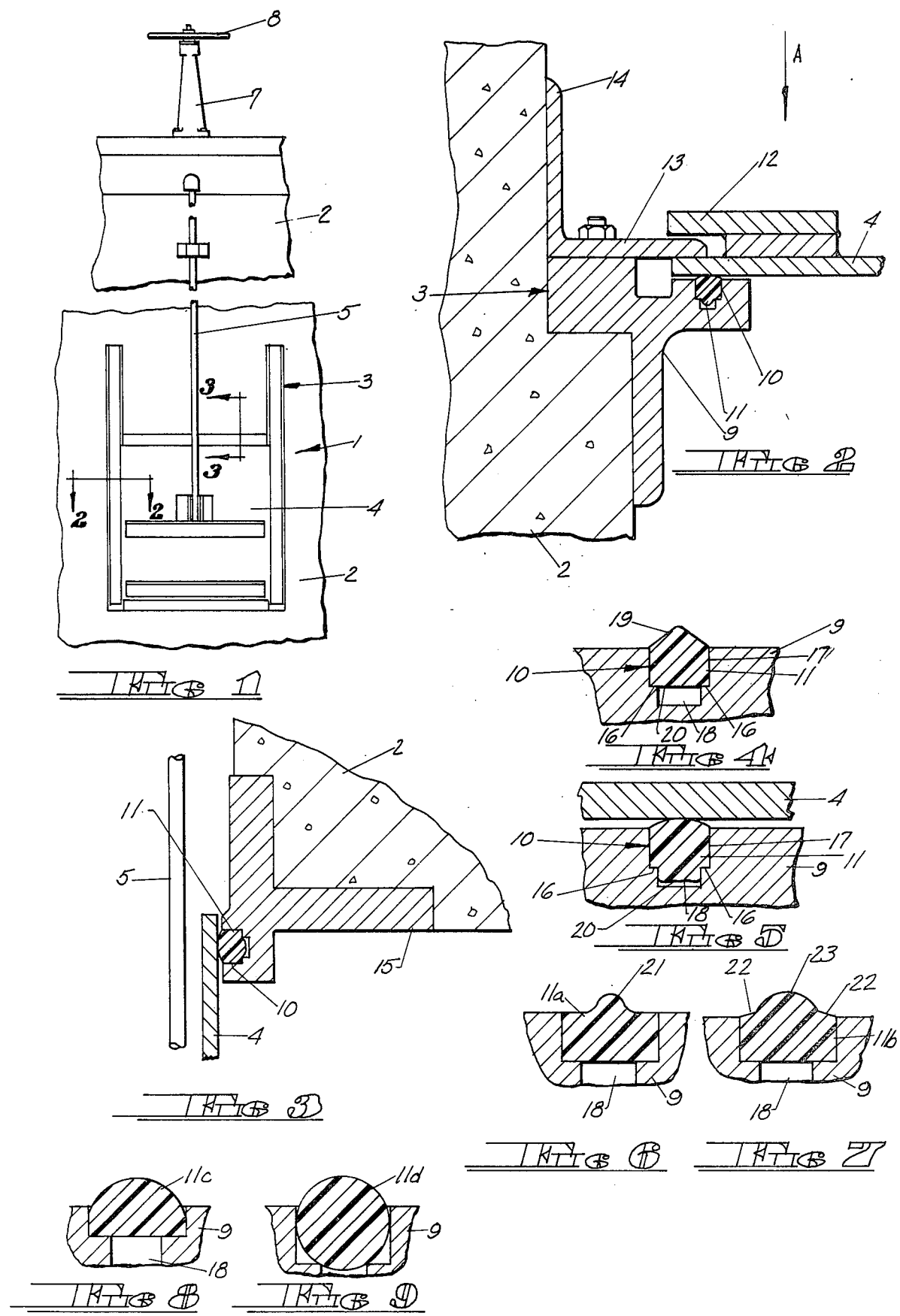

SEALING MEANS FOR SLIDE GATE

This invention relates to slide gates for controlling the flow of water and other liquids, and has to do more particularly with the provision of improved sealing means for use with slide type gates.

BACKGROUND OF THE INVENTION

The conventional slide gate assembly comprises a frame adapted to be secured to a retaining wall or the like, the frame including guide means adapted to slidably mount a slide for movement between opened and closed positions, the slide normally being movable vertically from one position to the other by mechanical lifting means, such as a threaded lift stem and handwheel. In some installations, particularly those intended for light duty, the slide simply seats against the adjoining surfaces of the frame, which forms a seat for the slide, the face pressure on the slide when closed forming an effective seal between the marginal edges of the slide and the frame. In some instances the seating surfaces are machined to improve tightness. In installations wherein a greater degree of water tightness is desired, the frame is provided with a series of adjustable wedges which, when the slide is closed, act to wedge the slide into tight engagement with the frame.

Various other expedients also have been proposed to enhance the water tightness of slide gates, including the use of mating bronze sealing surfaces and various types of non-metallic sealing members, such as rubber gaskets. Expansible and contractable sealing members responsive to fluid pressure have also been employed.

Each of the foregoing expedients, while enhancing the water tightness, has presented various problems. Where wedges are employed, they add considerably to the cost of the gate assembly and require adjustment to insure the desired tight engagement between the seating surfaces. Where non-metallic resilient sealing members are utilized, considerable difficulty has been experienced by reason of the slide cutting or shearing the sealing member as the slide is opened and closed, and in other instances the movement of the slide acts to roll the sealing member out of the grooved seat in which it is mounted.

The present invention deals with the provision of improved sealing means in the form of resilient sealing members which are mounted in such a way that they will not be sheared by the slide or rolled from the grooves in which they are mounted.

SUMMARY OF THE INVENTION

In accordance with the present invention, the resilient sealing member is placed in a specially designed groove in the seat forming portion of the frame, the groove having a first or outer compartment of a size to receive the resilient sealing member, the sealing member having a contoured face positioned to project outwardly from the first compartment for contact with the slide. The groove also includes a second compartment underlying the first compartment, the second compartment being of a lesser cross-sectional dimension than the first compartment so as to provide a recess into which the under portion of the sealing member may be deflected as the slide is closed. That is, as the slide closes and applies pressure to the exposed face of the sealing member, a portion of the sealing member will be deflected into the second or inner compartment of the groove, thereby effectively permitting lateral displacement of the face of the sealing member so that it is not subject to shearing forces and yet will remain in sealing engagement with the slide.

With the arrangement just described, the sealing member is automatically accommodated to the slide without the necessity for special adjustments, and there is no need for close tolerances between the slide and the frame. It has been found that the use of sealing members in accordance with the present invention has eliminated the need for wedges in numerous installations.

The first compartment of the groove is preferably square or rectangular in cross-section, the sealing member being of corresponding configuration so as to just nicely seat in the first compartment. The underlying or second compartment also may be rectangular and will have a width somewhat smaller than the width of the first compartment, thereby providing opposing sealing member supporting shoulders between the two compartments. It has been found that this configuration provides firm support for the sealing member and yet, as lateral pressure is applied to the sealing member during closing of the slide, the undersurface of the sealing member lying between the supporting shoulders will readily deflect into the underlying compartment as pressure is applied to the outermost or face surface of the sealing member.

The face surface of the sealing member will be configured to resist shearing action by the slide and to this end the face of the sealing member may be of tapered or wedge shaped configuration or it may be of semicylindrical or rounded configuration, so that the slide will initially contact a relatively small portion of the sealing member, the configuration of the face surface facilitating the lateral deflection of the sealing member.

A principal object of the present invention is the provision of am improved sealing means for slide gates in the form of a resilient sealing member adapted to be received in a retaining groove provided with an expansion compartment into which a portion of the sealing member is deflected upon closing of the slide gate.

A further object of the invention is the provision of a resilient sealing member for use in a slide gate, the sealing member having a contoured face positioned to be contacted by the slide, the face being contoured to resist shearing action by the slide as it is moved relative to the sealing member, the contoured face of the sealing member additionally serving to displace the sealing member laterally in the direction of the expansion compartment forming a part of the groove in which the sealing member is mounted.

Another object of the invention is the provision of a slide gate sealing means which is of simple and inexpensive construction and is easy to install, and which provides a high degree of water tightness.

Still a further object of the invention is the provision of a slide gate sealing means which eliminates the necessity for using wedges to effect a tight seal between the slide gate and the surfaces against which it seats.

The foregoing objects, together with others which will appear hereinafter or which will be apparent to the worker in the art upon reading this specification, are accomplished by those constructions and arrangements of parts which will now be described in detail.

DESCRIPTION OF THE DRAWINGS

FIG. 1 is an elevational view with parts broken away of an exemplary slide gate incorporating the sealing means of the present invention.

FIG. 2 is an enlarged fragmentary horizontal sectional view taken along the line 2—2 of FIG. 1.

FIG. 3 is an enlarged fragmentary vertical sectional view taken along the line 3—3 of FIG. 1.

FIG. 4 is an enlarged fragmentary horizontal sectional view showing the initial installation of a sealing member constructed in accordance with the invention.

FIG. 5 is a fragmentary sectional view similar to FIG. 4 illustrating the sealing member of FIG. 4 upon being deflected by the slide.

FIG. 6 is an enlarged cross-sectional view of a modified resilient sealing member.

FIG. 7 is an enlarged cross-sectional view illustrating another modification of the sealing member.

FIG. 8 is an enlarged cross-sectional view illustrating another modification of the sealing member.

FIG. 9 is an enlarged cross-sectional view illustrating a further modification of the invention.

DESCRIPTION OF THE PREFERRED EMBODIMENTS

Referring first to FIG. 1 of the drawings which illustrates an exemplary slide gate assembly adapted to be fitted with sealing means in accordance with the invention, the gate assembly, indicated generally at 1, is mounted on a retaining wall or other supporting surface 2. The gate assembly includes a frame 3 which is secured to the retaining wall 2 either directly or by means of a thimble. The frame 3 mounts the slide 4 which is adapted to be raised and lowered by means of a lift stem 5 operatively connected at its lowermost end to slide 4, the uppermost end of the stem extending through a lift 7 mounted on top of the retaining wall 2, the lift having a hand wheel 8 by means of which the slide is raised and lowered. The precise configuration and construction of the slide gate assembly does not constitute a limitation on the invention, and the embodiment illustrated is intended to be exemplary of the basic operating components.

In accordance with the invention, and as seen in FIG. 2, the frame 3 includes a gate seat 9 having a recess or groove 10 adatped to receive a resilient sealing member 11 formed from rubber or a comparable resilient sealing material, the sealing member being positioned to contact the marginal side edges of slide 4. On its upstream side, indicated by the arrow A, the slide is provided along its opposite edges with guide lugs 12 which are welded to the slide and coact with the leg 13 of angle guide 14 to position the slide 4 in close proximity to the gate seat 9 as the slide is raised and lowered.

As seen in FIG. 3, the gate frame may include a horizontally disposed gate seat 15 adapted to seat against the marginal top edge of the slide when in its closed position, the gate seat 15 also having a horizontally extending groove 10 containing a sealing member 11. A horizontally disposed gate seat similar to the gate seat 15 may be provided along the bottom of the retaining wall for contact with the bottom marginal edge of the slide gate. Thus, the entire perimeter of the slide may be sealed; and to this end, the sealing member retaining grooves 10 may be so arranged that the sealing member itself may be continuous, i.e., formed as a closed loop. While in the embodiment illustrated the fluid flow orifice defined by the frame is essentially square, it will be understood that the orifice defining frame may be rectangular, circular or any other desired shape.

In accordance with the invention, and as seen in FIG. 4, the recess or groove 10 is divided by a pair of shoulders 16 into an upper or outer compartment 17 and an inner or lower compartment 18. The sealing member 11 is of the size to snugly fit into the outer compartment 17, with the opposite side edges of its undersurface seated on shoulders 16. In the embodiment illustrated in FIG. 4, the outer surface or face 19 of the sealing member projects outwardly beyond compartment 17 and, in this instance, the face of the sealing member has tapered sides terminating in a slightly rounded apex. When the slide 4 is closed, the outer surface of the sealing member is displaced laterally, i.e., in the direction of the groove 10, such deflection causing the undersurface 20 of the sealing member to enter and at least partially fill the inner or lower compartment 18, the displacement of the undersurface being resisted by the shoulders 16. Being formed from resilient material, the sealing member also will be compressed to some extent, but due to the fact that its undersurface is displaced into the inner compartment, excessive compressive forces on the sealing member are relieved and it becomes essentially self-aligning with respect to the slide. Since the sealing member is laterally displaceable, the slide does not shear or cut the sealing member, nor does the slide act to peel or roll the sealing member out of the groove. Thus, the shoulders 16 and inner compartment 18 provide for controlled deflection of the sealing member, with relief of excessive pressure as the undersurface of the sealing member deflects into the inner compartment. The sealing member thus is maintained in tight sealing contact with the slide and is effectively self-adjusting.

The configuration of the outersurface 19 of the sealing member may take different forms. As seen in FIG. 6, the sealing member 11a may have a rounded nose 21 or, as seen in FIG. 7, the sealing member 11b may combine tapered surfaces 22 with a semi-cylindrical central portion 23. Other contours also may be employed such as the sealing member 11c seen in FIG. 8, which is essentially semicylindrical in cross-section, or the sealing member 11d seen in FIG. 9, which is circular in cross-section. The essential consideration in all cases being the provision of a sealing member having an outer surface or face which minimizes shearing contact with the slide and at the same time will act to displace the sealing member inwardly into the inner compartment of the groove when excessive resistance is encountered. Sealing members of the configurations illustrated have been found effective irrespective of whether they are vertically or horizontally disposed relative to the slide.

As should now be evident, the instant invention provides an improved sealing means for slide gates, the sealing members being easily installed and readily replaceable. Due to the dual compartment construction of the recess or grooves in which the sealing member is received, it is effectively self-aligning and readily accommodates itself to the slide to form a watertight seal.

Modifications may be made in the invention without departing from its spirit and purpose. For example, while a preference is expressed for grooves in which the compartments are rectangular in cross-section, it will be evident that their configuration may be varied, as may be the depth of the outer compartment 17, depending upon the configuration of the sealing member, the essential requirement being the provision of an inner compartment into which a portion of the sealing member may be displaced to relieve excessive compression and shearing forces which would otherwise be encountered. Accordingly, it is not intended that the invention be limited other than in the manner set forth in the claims which follow.

The embodiments of the invention in which an exclusive property or privilege is claimed are defined as follows:

1. In a slide gate construction wherein an essentially planar slide is mounted for opening and closing movement relative to a supporting frame defining a fluid flow orifice, an improved sealing means for effecting a seal between the slide and the frame, said sealing means comprising a resilient sealing member adapted to be received in a groove in said frame on the downstream side of said slide, said sealing member having a body including a contoured front face, said groove having an outer compartment of a size to snuggly receive the body of said sealing member with its contoured front face projecting outwardly from said outer compartment, and an inner compartment underlying said outer compartment, the contoured front face of the sealing member being positioned to be contacted and displaced laterally inwardly by the slide as it is closed, the lateral displacement of the contoured front face of the sealing member causing a portion at least of the body of the sealing member to be displaced into the inner compartment of said groove, whereby excessive compression of the sealing member is relieved each time the slide is closed and the sealing member is accommodated to the slide to form a tight seal between the slide and the frame.

2. The sealing means claimed in claim 1 wherein the width of the said inner compartment is less than the width of the outer compartment, thereby defining supporting shoulders for the sealing member at the juncture of the inner and outer compartments of said groove.

3. The sealing means claimed in claim 2 wherein said outer compartment is essentially rectangular in cross-section.

4. The sealing means claimed in claim 1 wherein the contoured front face of said sealing member is of wedge shape, having opposing tapered surfaces meeting in a centrally disposed apex.

5. The sealing means claimed in claim 1 wherein the contoured front face of said sealing member is of curved configuration, having a centrally disposed rounded nose.

6. The sealing means claimed in claim 1 wherein the contoured front face of the sealing member has a semi-cylindrical central portion terminating in tapered surfaces along its opposite sides.

7. The sealing means claimed in claim 1 wherein the contoured front face of said sealing member is of semi-cylindrical configuration.

8. The sealing means claimed in claim 1 wherein said sealing member is cylindrical in cross-section.

* * * * *